Sept. 3, 1957 R. D. GOULD ET AL 2,804,743
HYDRAULIC TREE SHAKER
Filed Aug. 24, 1953 2 Sheets-Sheet 1
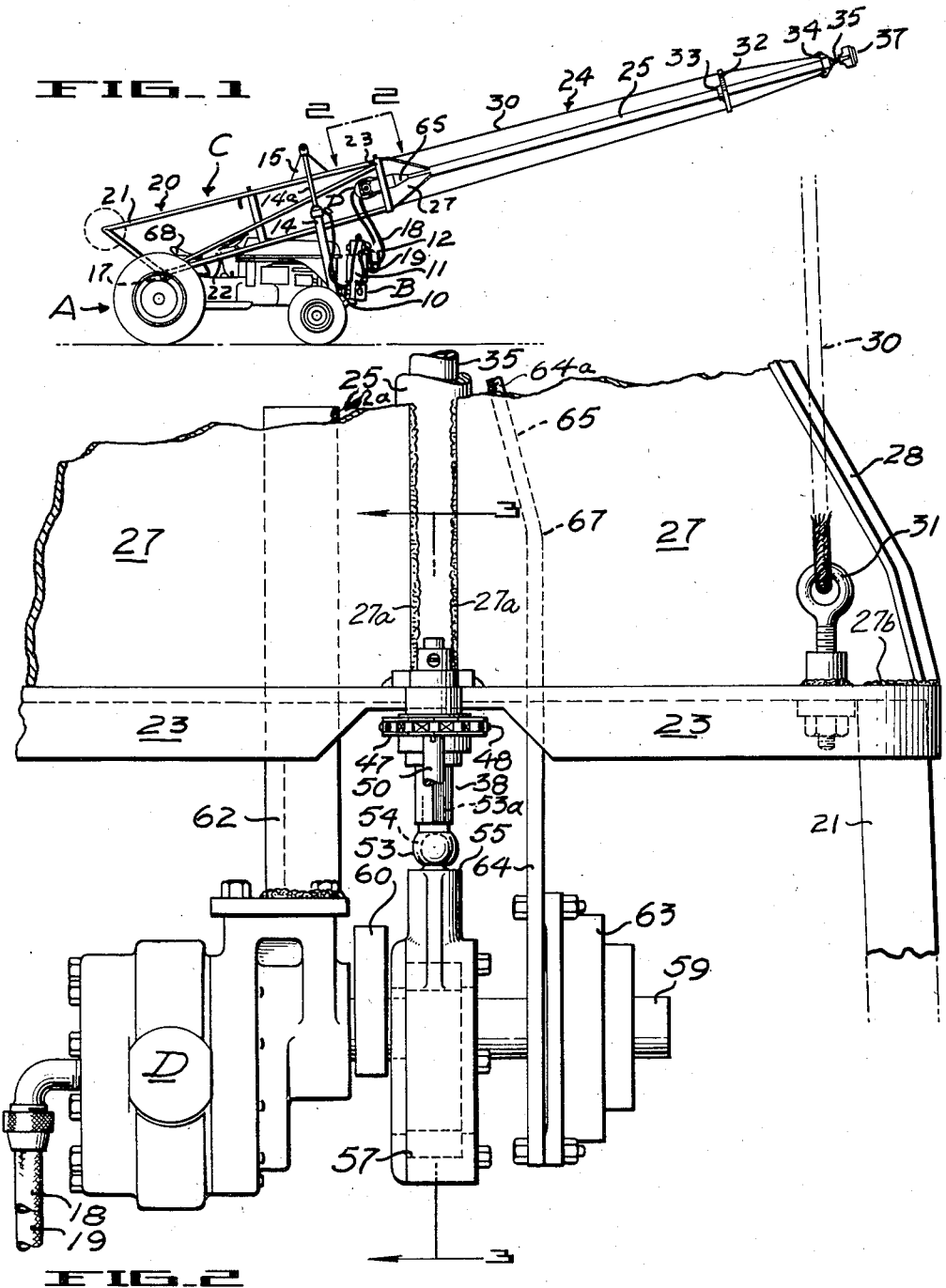
INVENTORS
RUSSELL D. GOULD &
EDWIN B. GOULD
BY
Hansen and Lane
ATTORNEYS Sept. 3, 1957 R. D. GOULD ET AL 2,804,743
HYDRAULIC TREE SHAKER
Filed Aug. 24, 1953 2 Sheets-Sheet 2
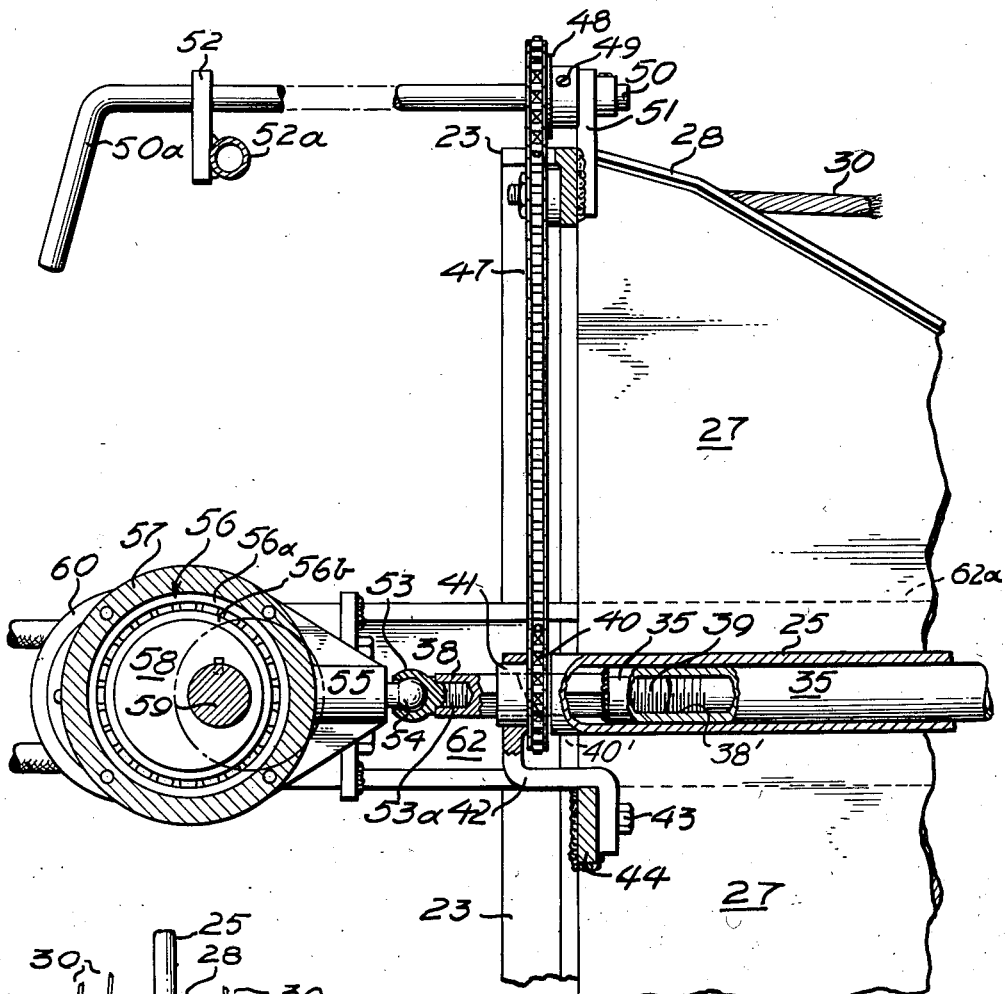
FIG_3
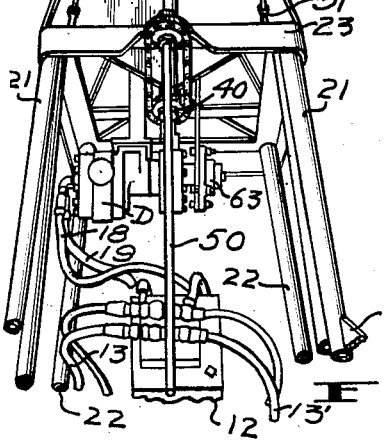
FIG_4
INVENTOR.
RUSSELL D. GOULD
EDWIN B. GOULD
By Hansen and Lane
ATTORNEYS United States Patent Office 2,804,743
Patented Sept. 3, 1957

2,804,743

HYDRAULIC TREE SHAKER

Russell D. Gould and Edwin B. Gould, San Jose, Calif.

Application August 24, 1953, Serial No. 375,893

4 Claims. (Cl. 56—328)

The present invention relates to a tree shaker and pertains more particularly to a shaker for harvesting fruit and nuts. The invention is of the same general character as that disclosed in our co-pending application Serial No. 275,922, filed March 11, 1952, now Patent No. 2,685,775, issued August 10, 1954.

Among the objects of the invention are the provision of new and simplified actuating mechanism for a tree shaker; the provision of improved actuating mechanism for reciprocating a central member which extends lengthwise to the outer end of a boom and is provided with a rotatably adjustable tree engaging member on the outer end thereof; the provision of a tree shaking element mounted to extend lengthwise of a boom with hydraulically actuated shaking means, and improved means for rotatively adjusting a tree engaging element on the outer end of the shaking element.

These and other objects and advantages of the invention will be understood from the following description and the accompanying drawings comprising two sheets, wherein:

Fig. 1 is a side elevational view in reduced scale of a tractor with an improved tree shaking apparatus embodying the invention mounted thereon.

Fig. 2 is an enlarged fragmentary plan view taken in the direction of the arrows 2—2 in Fig. 1, portions being broken away.

Fig. 3 is a sectional view taken along line 3—3 of Fig. 2, portions being broken away.

Fig. 4 is a perspective fragmentary view in slightly larger scale than Fig. 1 looking down onto the shaker drive unit and hydraulic pump assemblies from a point slightly rearwardly of the arrows 2—2 of Fig. 1.

In general, the device shown in Fig. 1 comprises a conventional four-wheel farm tractor A with a hydraulic pump B mounted thereon. Tractor mounted hydraulic pumps are well known and are available either as standard or accessory equipment on many tractors now sold in the United States. The details of the hydraulic pump and its usual hydraulic fluid supply tank form no part of the present invention. In the illustrated tractor, the hydraulic pump is driven by the power take-off shaft 10 of the tractor, but any suitable means for providing an adequate supply of properly pressurized hydraulic liquid may be employed. A conventional accumulator 11 wherein the hydraulic liquid is maintained under high pressure is mounted above the pump B, and conventional pressure release valve means (not shown) are provided to by-pass oil back to the usual hydraulic oil supply tank (not shown) to limit the maximum pressure attainable in the accumulator.

Conventional hydraulic control valve means 12 are provided to control the flow of pressurized liquid from the accumulator, and these valves preferably are operated by remote control in a conventional manner by the tractor operator. From the hydraulic control valves 12 one pair of high pressure hydraulic hoses 13, 13' are connected to actuate a pair of hydraulic jacks 14 which are pivotally connected at their lower ends to the tractor frame and at their upper ends to a pair of triangular attaching plates 15 mounted one on each side of a boom C which is pivotally mounted on the rear of the tractor at 17. A hydraulic hose 18 is connected from the valve 12 to the inlet side of a hydraulic motor D which may be a positive pressure rotary type fluid pump, such as, for example, those discussed in section 2–72, Kent's Mechanical Engineer's Handbook, eleventh edition. The valve 12 controls the flow of pressurized hydraulic fluid from the accumulator 11 to the hydraulic motor D. A second or return flexible hydraulic hose 19 is connected from the outlet side of the motor D to the hydraulic fluid supply tank, not shown. When such a pump is used for a motor, as is well known to those versed in the art, the inlet and outlet connections are reversed. That is, the opening which is the inlet when used as a pump becomes the outlet when used as a motor, while the outlet opening when used as a pump becomes the inlet when used as a motor.

The boom C comprises a trussed, tubular rear or inner portion 20 having a pair of straight, tubular, longitudinally extending upper corner members 21 and a pair of similar lower corner members 22. These boom corner members are secured at their forward ends into the four corners of a rectangular angle iron frame 23. An outer boom portion 24 is mounted on the forward end of the rear or inner frame portion 20 to extend forwardly therefrom. The outer boom portion 24 comprises a tubular central member 25, with four triangular brace plates 27 welded at 27a (Fig. 2) to extend along radial planes of the tube 25 at its rear or inner end, and at right angles to each other. A T-flange 28 is provided along the outer edge of each radial brace plate 27 for added rigidity, and the rear outer corner of each brace plate 27 is welded at 27b into a corner of the angle iron frame 23. Four cable truss stays 30 are provided, one being secured to an eye bolt 31 adjacent each corner of the frame 23. These truss stays are carried over the four radially extending arms 32 of a cross fitting 33 mounted on the boom tube 25 and are secured at their forward ends, under desired tension to a cap fitting 34 secured to the outer end of the boom tube.

A reciprocating shaker tube 35 is telescopically inserted for slidable axial movement in the boom tube 25 (Figs. 2 and 3) and extends outwardly beyond the outer or forward end of the boom tube as shown in Fig. 1. A tree engaging yoke or shoe 37, which may be similar to that disclosed in our copending application, Serial No. 275,922 mentioned previously herein, is mounted on the outer forwardly projecting end of the shaker tube 33.

For reciprocating and rotatively adjusting the shaker tube 35 and the tree engaging shoe 37 mounted thereon relative to the boom tube 25, a hexagonal shaft 38 (Fig. 3) with an integral, threaded portion 39 thereon, is screwed into the internally threaded inner end of the inner boom tube 35 and is welded thereto at 39a to constitute a substantially integral portion thereof. A sprocket wheel 40 having a hexagonal bore 40' corresponding to the hexagonal shaft extension 38 is slidably fitted thereon for rotative movement therewith. A hub portion 41 of this sprocket 40 is journaled in a bearing bracket 42 secured by a cap screw 43 (Fig. 3) to a bar 44 welded to extend transversely from one of the lower boom brace plates 27 to the other. An adjusting chain 47 is trained around the sprocket 40 and also around a second similar sprocket wheel 48 secured by a set screw 49 to a manual control rod 50. A notch 51 in the angle iron frame 23 (Fig. 2) provides running clearance for the chain 47.

The manual control rod 50 is journaled in bearing brackets 51 and 52 (Fig. 3) welded to the top portion of the angle iron frame 23 and to a cross member 52a of the rear boom portion 20, respectively. The rear end portion 50a of the control rod 50 is bent at a substantial angle to the remainder of the rod to provide a hand grip portion for rotative adjustment of the control rod, and thereby, through the sprockets 40 and 48, of the shaker tube 35 and the tree engaging shoe 37 mounted thereon.

The threaded shank 53a of a ball socket 53 (Fig. 3) is screwed into a threaded axial recess 38' provided therefor in the rear or inner end of the hexagonal shaft member 38. A ball drive member 54 is fitted for universal movement into the socket member 53 in a conventional manner and is mounted on a boss 55 of a ring 57 fitted onto the outer race 56a of a ball bearing 56. The inner race 56b of the bearing 56 is fitted onto an eccentric disk 58 mounted on the shaft 59 of the hydraulic motor D. The motor D may be of any suitable type, several of which are known to those familiar with the art. A counterweight 60 is mounted on the shaft with its center of dynamic unbalance opposite to that of the eccentric disk 58, to balance, at least partially, the moments of centrifugal force created by the rotation of the motor shaft 59.

The motor D is mounted on a channel support member 62 which is welded at 62a into the angle between the brace plates 27, 27 on one side of the boom C. The motor shaft 59 beyond the eccentrically mounted drive disk 58 is journaled in a conventional ball bearing 63 bolted to a plate 64 which is welded at 64a into the angle between the triangular brace plates 27 on the other side of the boom from the motor support 62. The forward end of the bearing support plate 64 is tapered at 65 (Fig. 1) and is bent inwardly at 67 (Fig. 2) to fit into the angle formed by the converging triangular brace plates 27 to which it is welded.

A considerable amount of power is required to shake a large branch or tree. For this reason we prefer to use a pump and motor combination which will develop about thirty horsepower at the motor shaft. For this result a pump delivering about thirty G. P. M. at a pressure of 1500 pounds p. s. i. at 2000 R. P. M. and driving a motor of sufficiently larger capacity to rotate at approximately 750 R. P. M. is satisfactory.

In operating the device, the tractor operator drives the tractor A so as to aim the boom C directly at a limb to be engaged for shaking.

The hand grip portion 50a of the manual control rod 50 is mounted conveniently adjacent the driver's seat 68, so that as the shoe 37 approaches the limb to be engaged, the shaker tube 35 is rotatably adjusted by means of the control rod 50 and the sprockets 40 and 48 and the chain 47 to engage the limb properly for shaking. During this approach to the selected limb, the jacks 14 are actuated by the operator in a conventional manner to extend or retract the piston rods 14a of the jacks, and thereby to raise or lower the outer end of the boom C as required.

The tractor then is advanced to bring the shoe 37 into engagement with the tree, and a slight distance further to place the engaged portion of the tree under bowed stress. With the tractor braced in this position, operation of a selected valve 12 introduces oil under high pressure through the hose 18 to the motor D causing it to rotate. This rotates the motor shaft 59 and the eccentric disk 58 mounted thereon. This action is transmitted through the ball 54 and socket 53 to reciprocate the shaker tube 35 and the shoe 37 thereon. This causes a violent shaking of the portion of the tree engaged by the shoe 37, and, in fact, of the entire tree if it is a medium size fruit or nut tree.

The speed of the motor D may be controlled by selecting the amount of opening of the hydraulic valve which operates it to vary the period of vibration to which the tree is subjected. The operator soon learns the most effective points of application on a tree or limb for the shoe 37, and also the most effective rates of vibration. By proper use of the mechanism, the fruit or nuts are snapped from the tree in a very short shaking period. Usually from 2 to 5 seconds is sufficient to divest the tree or at least the limb engaged and those adjacent thereto, of all of its ripe or nearly ripe fruit or nuts.

The tractor then may be backed away to free the shoe 37 from the tree and quickly re-manipulated to engage another limb or tree.

The device is relatively inexpensive, is simple and easy to operate, and may be quickly and easily mounted on or dismounted from a tractor either of the wheel or crawler type by the provision of necessary adapters or mounting fittings. Thus the tractor may be used for general ranch or orchard work during the remainder of the year, but the device may be quickly mounted on the tractor for use during the harvesting season.

While we have illustrated and described a preferred embodiment of the present invention, it will be understood however, that various changes and modifications may be made in the details thereof without departing from the spirit and scope of the invention as set forth in the appended claims.

Having thus described the invention, what we claim as new and desire to protect by Letters Patent is defined in the following claims:

1. In a tractor mounted tree shaking mechanism wherein a boom is mounted for vertical adjustment on a tractor and a shaker member is mounted for rotative and axial slidable movement on said boom, a tree engaging shoe being mounted on the outer end of said shaker and projecting beyond the outer end of said boom, with control means mounted rotatively to adjust said shaker; a fluid driven motor mounted on said boom, an eccentric disk rotatively driven by said motor and a ring journaled on said eccentric disk and having wobble driving connection with said shaker reciprocally to drive said shaker and the tree engaging shoe thereon.

2. In a tractor mounted tree shaking mechanism wherein a boom is mounted for vertical adjustment on a tractor and a shaker member is mounted for rotative and axial slidable movement on said boom, a tree engaging shoe being mounted on the outer end of said shaker and projecting beyond the outer end of said boom, control means are mounted rotatively to adjust said shaker; a fluid driven motor mounted on said boom, a supply of pressurized fluid openly communicating with said motor to drive it; an eccentric disk rotatively driven by said motor, a ring journaled on said eccentric disk, and a wobble driving connection between said ring and said shaker reciprocally to actuate said shaker and the tree engaging shoe thereon.

3. In a tractor mounted tree shaking mechanism having a vertically adjustable boom, including a tubular outer boom member extending lengthwise throughout a substantial portion of the boom, with a shaker member mounted for rotative and axial slidable movement in said outer boom member and projecting beyond the outer end of the latter, and a tree engaging shoe mounted on the outer projecting end of said shaker, non-reciprocative rotative adjusting means being operatively connected to said shaker; a fluid driven motor mounted on said boom, a supply of pressurized fluid controllably connected to said motor, a pair of fixed bearings secured to said boom inwardly of said shaker, a shaft journaled in said bearings to extend transversely of, and inwardly of said shaker, drive means operatively connecting said motor to said shaft, a disk secured eccentrically on said shaft for rotation therewith, a ring journalled on said eccentric disk, and wobble drive means connecting said disk to said shaker to drive said shaker and the tree engaging shoe thereon upon rotation of said shaft.

4. In a tractor mounted tree shaking mechanism wherein a boom is mounted for vertical adjustment on a tractor and a shaker member is mounted for rotative and axial slidable movement on said boom, a tree engaging shoe being mounted on the outer end of said shaker and projecting beyond the outer end of said boom, with control means mounted rotatively to adjust said shaker; a fluid driven motor mounted on said boom, a shaft rotatively driven by said motor, an eccentric element mounted on said shaft for rotation therewith, and wobble driving connecting means operatively interconnecting said eccentric element with said shaker, thereby reciprocally to drive said shaker and the tree engaging shoe thereon upon a rotation of said shaft.

References Cited in the file of this patent

UNITED STATES PATENTS

| | | |
|---|---|---|
| 1,472,262 | Abildgaard | Oct. 30, 1923 |
| 2,159,311 | Berger | May 23, 1939 |
| 2,568,193 | Johnsen | Sept. 18, 1951 |
| 2,685,775 | Gould et al. | Aug. 10, 1954 |
| 2,690,639 | Goodwin | Oct. 5, 1954 |